(12) United States Patent
Arai (10) Patent No.: US 8,264,515 B2
(45) Date of Patent: Sep. 11, 2012

(54) OPTICAL SCANNING DEVICE AND IMAGE FORMING APPARATUS

(75) Inventor: Nobuyuki Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 12/833,282

(22) Filed: Jul. 9, 2010

(65) Prior Publication Data
US 2011/0012982 A1    Jan. 20, 2011

(30) Foreign Application Priority Data

Jul. 14, 2009    (JP) .................................. 2009-165537

(51) Int. Cl.
*B41J 15/14* (2006.01)
*B41J 27/00* (2006.01)

(52) U.S. Cl. ........................................ 347/244; 347/258
(58) Field of Classification Search ................. 347/230, 347/241–244, 256–258
See application file for complete search history.

(56) References Cited

U.S. PATENT DOCUMENTS

| | | | | |
|---|---|---|---|---|
| 5,247,385 A * | 9/1993 | Takanashi | .................. | 359/205.1 |
| 6,133,935 A * | 10/2000 | Fujibayashi et al. | .......... | 347/258 |
| 6,556,332 B2 | 4/2003 | Ishihara | | |
| 6,590,688 B2 * | 7/2003 | Ishihara | .................... | 359/207.5 |
| 6,690,497 B2 | 2/2004 | Ishihara | | |
| 7,116,347 B2 * | 10/2006 | Kawamura | .................... | 347/249 |
| 7,215,354 B1 * | 5/2007 | Sakai et al. | .................... | 347/244 |
| 7,414,765 B2 * | 8/2008 | Miyatake | .................... | 359/205.1 |
| 7,626,744 B2 | 12/2009 | Arai et al. | | |
| 2008/0219601 A1 | 9/2008 | Arai et al. | | |
| 2008/0267662 A1 | 10/2008 | Arai et al. | | |
| 2008/0285104 A1 | 11/2008 | Arai et al. | | |
| 2009/0141316 A1 | 6/2009 | Arai et al. | | |
| 2009/0195636 A1 | 8/2009 | Arai et al. | | |
| 2009/0314927 A1 | 12/2009 | Tatsuno et al. | | |

FOREIGN PATENT DOCUMENTS

| | | | |
|---|---|---|---|
| JP | 3913424 A | 5/2001 | |
| JP | 2004-086019 A | 3/2004 | |
| JP | 3854779 A | 9/2006 | |

* cited by examiner

*Primary Examiner* — Hai C Pham
(74) *Attorney, Agent, or Firm* — Dickstein Shapiro LLP (57) ABSTRACT

An optical scanning device includes: a light source; an optical deflecting unit that deflects a light beam emitted from the light source to scan on a scanning surface in main-scanning direction; and a scanning optical system that includes a first scanning lens and a second scanning lens that converge the light beam that is deflected onto the scanning surface. Distance between an exit surface of the first scanning lens and an incident surface of the second scanning lens is shorter than distance between a deflection facet of the optical deflecting unit and an incident surface of the first scanning lens, an exit surface of the second scanning lens is nearer to the deflection facet than a midpoint between the deflection facet and the scanning surface, and an image-surface-side principal point of the scanning optical system in sub-scanning direction is nearer to the scanning surface than the midpoint.

6 Claims, 7 Drawing Sheets

POWER OF L1 IN MAIN SCANNING DIRECTION

FIG. 3B

POWER OF L1 IN SUB-SCANNING DIRECTION

FIG. 3C

MAIN SCANNING-CROSS-SECTIONAL PROFILE OF L1

FIG. 4A

POWER OF L2 IN MAIN SCANNING DIRECTION

DISTANCE IN MAIN SCANNING DIRECTION [mm]

FIG. 4B

POWER OF L2 IN SUB-SCANNING DIRECTION

DISTANCE IN MAIN SCANNING DIRECTION [mm]

FIG. 4C

MAIN SCANNING-CROSS-SECTIONAL PROFILE OF L2

FIG. 5

DISTANCE IN MAIN SCANNING DIRECTION [mm]

FIG. 6

AMOUNTS OF FIELD CURVATURE IN THE SUB-SCANNING DIRECTION

IMAGE HEIGHT [mm]

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2009-165537 filed in Japan on Jul. 14, 2009.

BACKGROUND OF THE INVENTION

1. Field of the Invention

The present invention is directed generally to optical scanning device that has great flexibility in layout design of scanning optical system and narrow variation in beam-spot size, and is directed to image forming apparatus that uses the optical scanning device.

2. Description of the Related Art

In a typical optical scanning device for use in a laser printer, an optical plotter, a digital copying machine, a facsimile apparatus, or the like, optical scanning is performed such that a light beam from a light source device is caused to strike an optical deflector, such as a polygon mirror, to be deflected thereby and thereafter to travel through a scanning optical system arranged downstream in optical path of the optical deflector. The light beam is focused through the scanning optical system onto a scanning surface, which is the surface of a photoconductive, on a photosensitive image carrier.

A specific example of such an optical scanning device includes a type that includes four image carriers such as photosensitive drums aligned in a conveying direction of a transfer sheet, and that is configured such that each of the surfaces of the image carriers is optically scanned. Light beams, emitted from a plurality of light source devices corresponding to these image carriers, are deflected by a single optical deflector so as to simultaneously illuminate the image carriers for exposure through a plurality of scanning optical systems, each corresponding to one of the image carriers; hence, a latent image is formed on each of the image carriers. These latent images are developed with developing agent of different colors, such as yellow, magenta, cyan, and black, into visible images which are then transferred onto a single transfer sheet to be superimposed on one another. Thus, a multiple-color image is formed.

To meet recent demands for space-saving design of image forming apparatuses, demands have also arisen for compact, low-profile design of optical scanning devices used in the image forming apparatuses. Meanwhile, optical scanning devices are required to be of not only compact, low-profile design but also to be enhanced in image quality. To enhance image quality, it is necessary to reduce beam-spot size and prevent a range of variation in beam-spot size from becoming wide.

Layout design of a reflecting mirror, which is arranged such that light having been deflected by an optical deflector is incident on the reflecting mirror, is a key factor for compact design of optical scanning devices; by arranging a scanning lens close to the optical deflector, flexibility in layout design of the reflecting mirror can be increased.

To reduce size of beam spot on a scanning surface and variation in beam-spot size, it is required to perform compensation related to various optical properties, such as field curvature, wavefront aberration, and magnification error. To perform the compensation related to these properties, a plurality of scanning lenses are preferably used.

Examples of a scanning optical system that includes a plurality of scanning lenses arranged near an optical deflector include an optical scanning device disclosed in Japanese Patent Application Laid-open No. 2001-296491.

The optical scanning device disclosed in Japanese Patent Application Laid-open No. 2001-296491 is configured such that the distance between an optical deflector and a scanning surface is relatively short, a plurality of scanning lenses are arranged near the optical deflector, and a field curvature in main-scanning cross section is compensated depending on surface geometry of the scanning lens. As for the main-scanning direction, magnification of an optical system substantially depends on a focal distance of a coupling lens; accordingly, field curvature can be compensated by adjusting geometry of the scanning lenses, thereby narrowing variation in beam-spot size. As for the sub-scanning direction, sub-scanning lateral magnification depends on layout design of and power distribution among the scanning lenses. By adopting such configuration as described above, flexibility in layout design of reflecting mirror is increased.

However, positions and geometry of the lenses in the optical scanning device disclosed in Japanese Patent Application Laid-open No. 2001-296491 are disadvantageous in involving considerably large sub-scanning lateral magnification. For example, according to layout design of the first embodiment described in Japanese Patent Application Laid-open No. 2001-296491, lateral magnification is −6.68 times in the sub-scanning direction. As the sub-scanning lateral magnification increases, the magnitude of influence exerted by dimensional variation and variation in installation positions of the optical deflector and the scanning lenses increases; accordingly, even when field curvature and magnification error are favorably compensated in theory, an actual product exhibits relatively wide variation in beam-spot size. This disadvantage can be prevented by achieving high precision in dimensional accuracy, processing accuracy, and accuracy in installation positions of polygon mirror and optical system upstream, in optical path, of the optical deflector; however, this countermeasure can lead to additional manufacturing cost.

To this end, a technique is disclosed in Japanese Patent Application Laid-open No. 2004-086019 related to an optical scanning device for reducing sub-scanning lateral magnification of scanning optical system to approximately −1× by arranging a second scanning lens near an endpoint of an optical path through which light travels from a polygon mirror to a scanning surface.

Meanwhile, for a scanning optical system, use of a plurality of lenses is generally advantageous to compensation for field curvature and wavefront aberration and therefore leads to reduction in beam-spot size. However, use of a plurality of scanning lenses undesirably reduces flexibility in layout design of a reflecting mirror, which is disclosed in an optical scanning device configured according to the technique disclosed in Japanese Patent Application Laid-open No. 2004-086019. Particularly in a color laser printer or the like that includes reflecting mirrors for four stations, flexibility in layout design of the reflecting mirrors is much reduced, which is disadvantageous.

Because arranging the reflecting mirror downstream of the second scanning lens can shorten distance between mirrors, particularly in an optical system that includes two or three reflecting mirrors, this can disadvantageously make it difficult to ensure space for use in adjusting layout design of the reflecting mirrors. Optical scanning devices, configured to provide a wide variety of choices of layout design of reflecting mirrors, are less susceptible to this disadvantage. However, this disadvantage has a large effect on the optical scanning device configured as disclosed in Japanese Patent Application Laid-open No. 2004-086019, because the optical scanning device has reduced flexibility in layout design of the reflecting mirrors. The reflecting mirror can be positioned between the two scanning lenses rather than downstream from the second scanning lens; however, this arrangement is disadvantageous in that light beam can obliquely fall on the second scanning lens, resulting in curved scanning line or the like. To position the second scanning lens downstream from the reflecting mirror, at which scan width is relatively large, it is necessary to employ a lens of a greater length as the second scanning lens; this can lead to additional manufacturing cost.

As described above, arranging the scanning lens near the optical deflector with higher priority on flexibility in layout design of the reflecting mirror can increase the sub-scanning lateral magnification and widen variation in beam-spot size. On the other hand, disadvantageously can reduce flexibility in the layout design of the reflecting mirror, when arranging the second scanning lens near the endpoint of the optical path through which light beam travels from the optical deflector to the scanning surface to place higher priority on reduction in sub-scanning-direction lateral magnification.

SUMMARY OF THE INVENTION

It is an object of the present invention to at least partially solve the problems in the conventional technology.

According to one aspect of the present invention, there is provided an optical scanning device comprising: a light source; an optical deflecting unit that deflects a light beam emitted from the light source to scan on a scanning surface in main-scanning direction; and a scanning optical system that includes a first scanning lens and a second scanning lens that converge the light beam deflected by the optical deflecting unit onto the scanning surface, wherein distance between an exit surface of the first scanning lens and an incident surface of the second scanning lens is shorter than distance between a deflection facet of the optical deflecting unit and an incident surface of the first scanning lens, an exit surface of the second scanning lens is nearer to the deflection facet than a midpoint between the deflection facet and the scanning surface, and an image-surface-side principal point of the scanning optical system in sub-scanning direction is nearer to the scanning surface than the midpoint between the deflection facet and the scanning surface.

According to another aspect of the present invention, there is provided an image forming apparatus that forms an image by performing electrophotographic image forming process, the image forming apparatus comprising an optical scanning device as a device that performs exposure process in the electrophotographic image forming process, wherein the optical scanning device includes: a light source; an optical deflecting unit that deflects a light beam emitted from the light source to scan on a scanning surface in main-scanning direction; and a scanning optical system that includes a first scanning lens and a second scanning lens that converge the light beam deflected by the optical deflecting unit onto the scanning surface, wherein distance between an exit surface of the first scanning lens and an incident surface of the second scanning lens is shorter than distance between a deflection facet of the optical deflecting unit and an incident surface of the first scanning lens, an exit surface of the second scanning lens is nearer to the deflection facet than a midpoint between the deflection facet and the scanning surface, and an image-surface-side principal point of the scanning optical system in sub-scanning direction is nearer to the scanning surface than the midpoint between the deflection facet and the scanning surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A to 3C are graphs illustrating properties of a first scanning lens illustrated in FIG. 1, where

FIGS. 4A to 4C are graphs illustrating properties of a second scanning lens illustrated in FIG. 1, where

DETAILED DESCRIPTION OF THE PREFERRED EMBODIMENTS

Optical Scanning Device:

Exemplary embodiments of optical scanning device according to the present invention are described in detail below with reference to the accompanying drawings.

Figure 1:
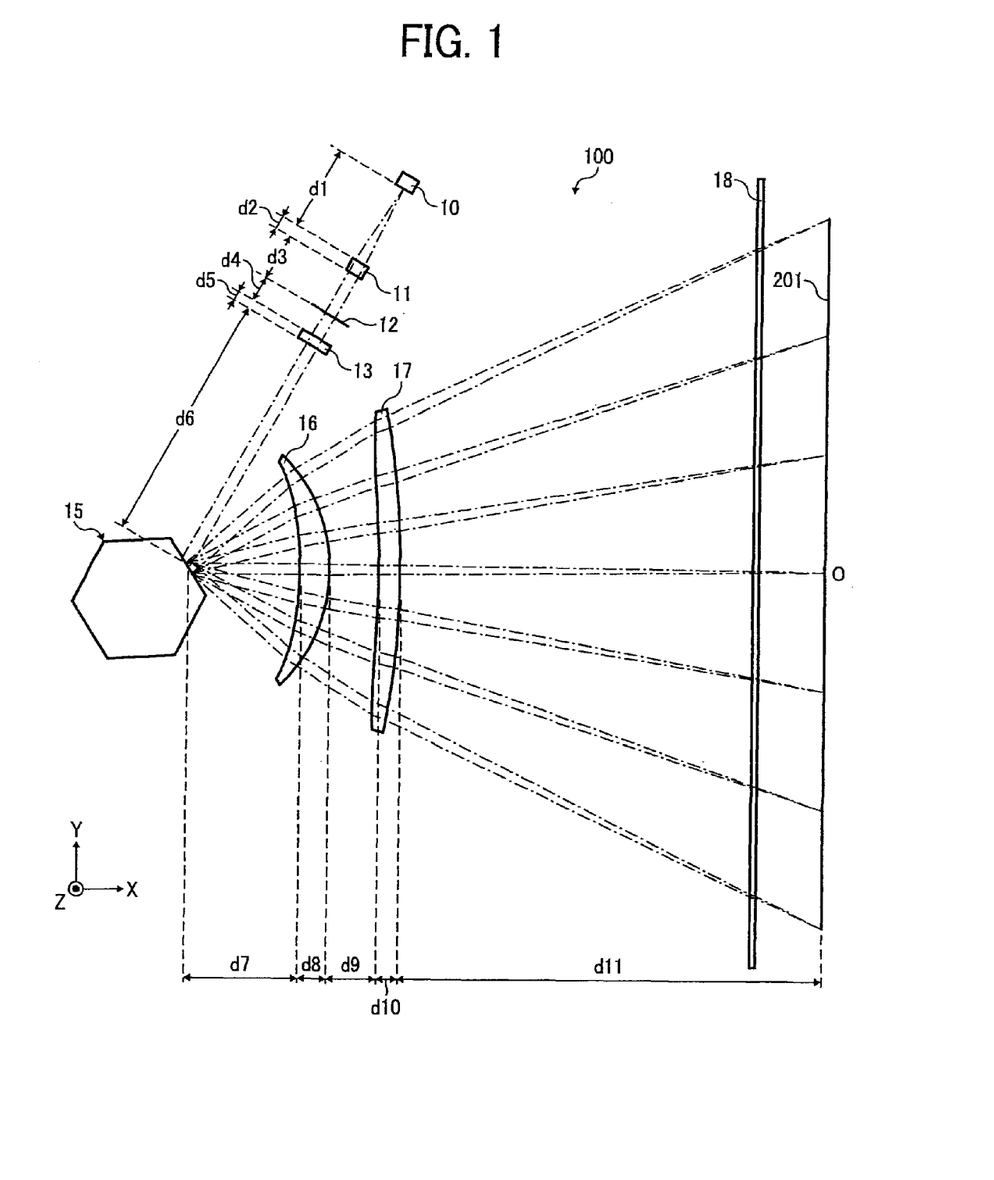
FIG. 1 is a schematic diagram of a configuration of an optical scanning device according to an embodiment of the present invention.

As illustrated in FIG. 1, an optical scanning device 100 according to an embodiment includes a light source 10, a coupling lens 11, an aperture member 12, a line-image-forming lens 13, and a polygon mirror 15 serving as an optical deflector, a first scanning lens 16, a second scanning lens 17, and a dust-proof glass member 18. Arranged are the coupling lens 11, the aperture member 12, the line-image-forming lens 13, and the polygon mirror 15 in this order from the light source 10 in a direction at a 60-degree angle down from the leftward direction. Arranged are the first scanning lens 16, the second scanning lens 17, and the dust-proof glass member 18 in this order in the positive X direction relative to the polygon mirror 15. An optical scanning is performed by causing a light beam emitted from the optical scanning device 100 to be focused on a photosensitive-drum surface (hereinafter, referred to as "scanning surface" in some cases).

The main-scanning direction, in which light spot is moved by rotation of the polygon mirror 15, is defined as the Y-axis direction. The sub-scanning direction perpendicular to the Y-axis direction is defined as the Z-axis direction in FIG. 1. The direction, perpendicular to the Y-axis and to the Z-axis and directed from the polygon mirror 15 to the scanning surface 201, is defined as the X-axis direction.

The light source 10 is a light-emitting diode (LD) array that emits light with wavelength of 659 nanometers and includes two light-emitting points spaced 30 micrometers apart. When the light-emitting points are horizontally aligned, lateral divergence angle of the light source 10 is 19 degrees (full-width half-maximum (FWHM)) and longitudinal divergence angle is 9 degrees (FWHM).

Figure 2:
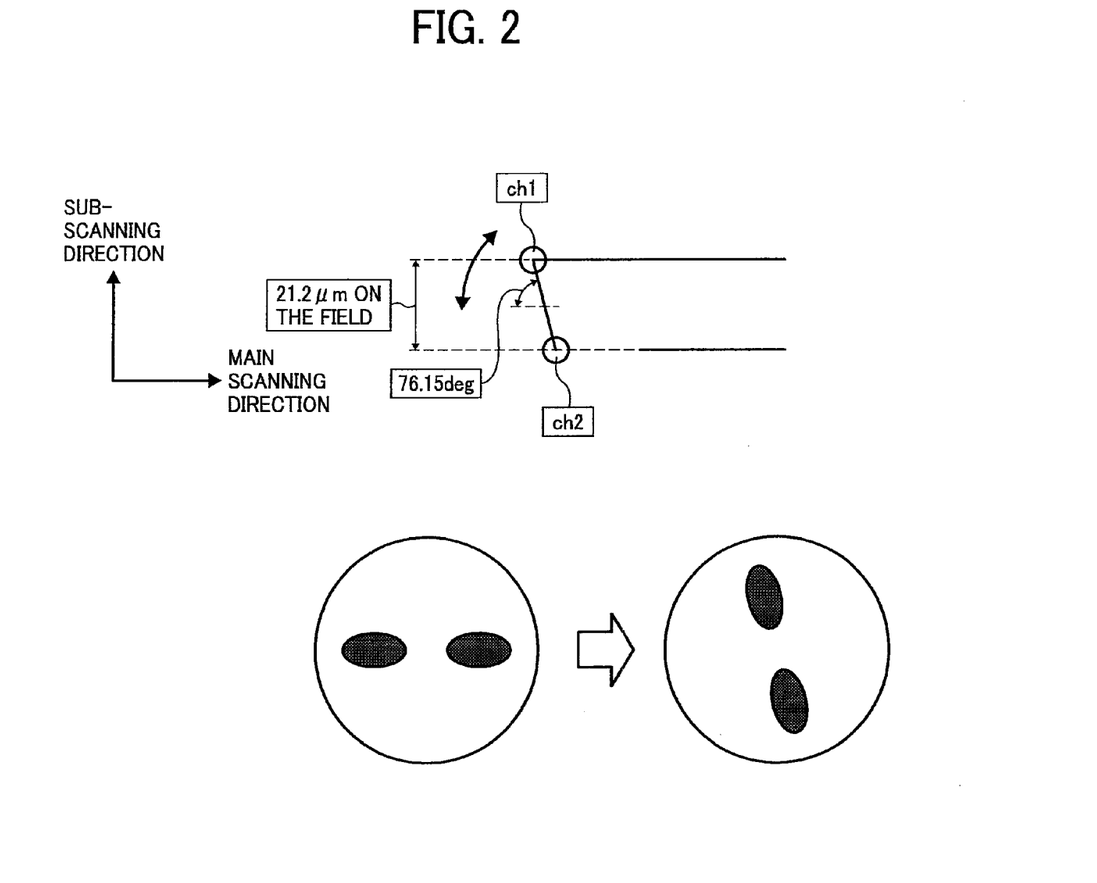
FIG. 2 is a schematic diagram illustrating a state in which two light sources are arranged as being rotated about optical axis in the optical scanning device illustrated in FIG. 1.

If the two light-emitting points are attached as being horizontally aligned in the main-scanning direction, beam spots are disadvantageously formed on a same position with respect to the sub-scanning direction on an image surface (field) of the photosensitive member. Accordingly, to obtain light beams apart from each other at a desired distance (hereinafter, "beam pitch") in the sub-scanning direction, it is preferable to arrange the two light-emitting points out of alignment in the sub-scanning direction by rotating the light source about the optical axis. In the present embodiment, it is assumed that write density is 1,200 dots per inch (dpi); to achieve this write density, the beam pitch on the photosensitive member in the sub-scanning direction is to be adjusted to 21.1 micrometers. In view of the circumstances, the optical scanning device 100 according to the present embodiment includes a mechanism (not shown) that rotates the light source about the optical axis for adjustment and is constructed such that light-emitting points are mounted to be rotatable for adjustment about the optical axis through 76.15 degrees from a horizontally-aligned state in the main-scanning direction (see FIG. 2). By causing the light source to be inclined at this angle, the desired beam pitch can be attained.

Although the present embodiment is described as a writing system where a plurality of beams is employed for high-speed and high-density writing, the present invention is not limited thereto, and applicable to an optical system where a single light-emitting point is employed.

The coupling lens 11 is a lens made of glass (whose refractive index is 1.6935) of which focal length is 27 millimeters. The coupling lens 11 collimates light beams emitted from the light source 10 into substantially parallel light beams so that the light beams have the same width as that at a focal point on the exit side.

The aperture member 12 has a rectangular or elliptical opening of which length in a direction corresponding to a main-scanning direction of the emitted light beams is 3.34 millimeters and length in a direction corresponding to a sub-scanning direction of the emitted light beams is 2.90 millimeters. The aperture member 12 is arranged such that center of the opening is near the focal point of the coupling lens 11.

The line-image-forming lens 13 is a cylindrical lens made of glass (whose refractive index is 1.5168) of which focal length is 93.3 millimeters. The line-image-forming lens 13 converges the light beams having passed through the aperture member 12 only in the sub-scanning direction, thereby forming a line image elongated in the main-scanning direction near a reflection facet of the polygon mirror 15.

The polygon mirror 15 is a member that serves as an optical deflector. A cross-sectional profile of the polygon mirror 15, taken along a plane perpendicular to the Z-axis, is a regular hexagon whose inscribed-circle radius is 16 millimeters. Deflection facets are formed on six side surfaces of this polygon mirror 15. The polygon mirror 15 is rotated by a rotating mechanism (not shown) at a constant angular velocity about an axis parallel to the Z-axis. With this configuration, a light beam incident on the polygon mirror 15 is deflected in the Y-axis direction to form, through the first scanning lens 16 and the second scanning lens 17, a beam spot on the scanning surface 201; optical properties, such as field curvature, wavefront aberration, and magnification error, of the beam spot are to be compensated.

Each of the first scanning lens 16 and the second scanning lens 17 is a lens made of resin of which refractive index is 1.530. Thickness of the first scanning lens 16 on the optical axis is 9.8 millimeters and that of the second scanning lens 17 is 6.4 millimeters. Because the optical scanning device 100 according to the present embodiment is configured to include the two scanning lenses, or specifically the first scanning lens 16 and the second scanning lens 17, the optical scanning device 100 allows various aberration, such as field curvature and wavefront aberration, to be compensated more effectively and beam-spot size on the scanning surface to be reduced more easily than an optical scanning device that includes a single scanning lens does. Geometries and powers of the first scanning lens 16 and the second scanning lens 17 of the present embodiment will be described later. The dust-proof glass member 18 is arranged between the photosensitive-member surface (scan surface) 201, which will be described later, and the pair of the first scanning lens 16 and the second scanning lens 17.

The dust-proof glass member 18 is a 1.90-millimeter-thick member made of glass whose refractive index is 1.530. The dust-proof glass member 18 has a function of protecting the optical scanning device 100 from dusts.

Light beams emitted from the optical scanning device 100 scan across the surface of the scanning surface 201 that has been uniformly electrostatically charged in advance so that an electrostatic latent image is formed on the surface of the scanning surface 201.

The optical scanning device 100 of the present embodiment is configured such that a beam spot whose size is 45 micrometers in the main-scanning direction and is 50 micrometers in the sub-scanning direction formed on the scanning surface. The angle of rotation and the field angle of the polygon mirror 15 for scanning this range are 39.6 degrees and 79.2 degrees, respectively. Point O in FIG. 1 indicates a point of intersection of a straight line passing through the rotation center of the polygon mirror 15 which is parallel to the X-axis and the scanning surface 201 of the photosensitive drum.

Described below is what makes the optical scanning device according to the present embodiment differ from conventional optical scanning devices. As described above, with conventional optical scanning devices, it has been difficult to reduce sub-scanning-direction lateral magnification without sacrificing flexibility in layout of the reflecting mirror. To this end, the optical scanning device according to the present embodiment is configured such that the scanning lenses are arranged near the polygon mirror to thereby ensure flexibility in layout design of reflecting mirror (not shown), and such that power distribution of the scanning lenses in the sub-scanning direction is adjusted to thereby reduce sub-scanning-direction lateral magnification. These features of the optical scanning device 100 according to the present embodiment will be described below.

Arrangement of the scanning lenses of the optical scanning device 100 according to the present embodiment will be described below.

The optical scanning device 100 according to the present embodiment is configured such that an exit surface of the second scanning lens 17 is arranged nearer to the polygon mirror 15 than a midpoint between the deflection facet of the polygon mirror 15 and the scanning surface 201 is. Specifically, while the distance between the polygon mirror 15 and the scanning surface 201 is 209.46 millimeters, the distance between the polygon mirror 15 and the exit surface of the second scanning lens 17 is 69.23 millimeters. As described above, all the scanning lenses are arranged nearer to the polygon mirror than the midpoint between the deflection facet of the polygon mirror and the scanning surface is. The optical scanning device 100 is also configured such that an image-surface-side (field-side) principal point of a scanning optical system, which includes the first scanning lens 16 and the second scanning lens 17, in the sub-scanning direction is nearer to the scanning surface 201 than the midpoint between the deflection facet of the polygon mirror 15 and the scanning surface 201 is.

This configuration allows space that is large enough to accommodate the reflecting mirror therein to be ensured in a zone nearer to the scanning surface than the midpoint between the scanning surface and the scanning surface is, thereby increasing flexibility in layout design of the reflecting mirror. Locating all the scanning lenses close to the polygon mirror as described above allows reduction in effective sizes of the scanning lenses, leading to compact design of the optical scanning device. In addition, because employment of smaller scanning lenses can lead to reduction in manufacturing cost of the scanning lenses, manufacturing cost of the optical scanning device can also be reduced.

The optical scanning device 100 according to the present embodiment is configured such that the distance between an exit surface of the first scanning lens 16 and an incident surface of the second scanning lens 17 is shorter than the distance between the deflection facet of the polygon mirror 15 and an incident surface of the first scanning lens 16. Specifically, while the distance between the polygon mirror 15 and the first scanning lens 16 is 25.19 millimeters, the distance between the first scanning lens 16 and the second scanning lens is 16.3 millimeters.

As the first scanning lens 16 and the second scanning lens 17 are moved away from the polygon mirror 15, the range where light beams pass through the lenses 16 and 17 in the main-scanning direction is widened, arising need for increasing sizes of the first scanning lens 16 and the second scanning lens 17 in the main-scanning direction. In view of this, it is advantageous to arrange the first scanning lens 16 and the second scanning lens 17 close to the polygon mirror 15 for enhancement of flexibility in layout design of the reflecting mirror and further space-saving design of the optical scanning device.

However, arranging these lenses close to the polygon mirror 15 is disadvantageous in that the sub-scanning lateral magnification is unfavorably increased, by which variation in position of the image surface resulting from dimensional variation and variation in installation-position accuracy of elements of the optical system, which ranges the light source 10 to the polygon mirror 15, is undesirably widened. This can result in degradation in image quality.

To this end, in the present embodiment, the second scanning lens 17 is arranged nearer to the polygon mirror 15 than the midpoint between the polygon mirror 15 and the scanning surface 201. The optical scanning device 100 is also configured such that the distance between the polygon mirror 15 and the first scanning lens 16 is longer than the distance between the first scanning lens 16 and the second scanning lens 17. This configuration allows the device to be compact while adopting a layout design that allows reduction in the sub-scanning lateral magnification.

Described below is the powers and geometries of the scanning lenses employed in the optical scanning device 100 according to the present embodiment that is to prevent an increase in sub-scanning-direction lateral magnification, which can otherwise occur when the arrangement of the scanning lenses described above is employed.

Geometry of optical surface of the first scanning lens can be expressed by a function expressed by Equation (1).

Equation (1)

$$X(Y) = \frac{\frac{Y^2}{R_m}}{1 + \sqrt{1 - (1 + a_{00}) \cdot \left(\frac{Y}{R_m}\right)^2}} + a_{01} \cdot Y + a_{02} \cdot Y^2 + a_{03} \cdot Y^3 + a_{04} \cdot Y^4 + \ldots \quad (1)$$

Geometry of optical surface of the second scanning lens can be expressed by a function expressed by Equation (2).

Equation (2)

$$Cs(Y) = \frac{1}{R_{s0}} + b_{01} \cdot Y + b_{02} \cdot Y^2 + b_{03} \cdot Y^3 + \ldots \quad (2)$$

In each of Equation (1) and Equation (2), Y is the distance in the main-scanning direction from origin point at which the optical axis is positioned, $R_m$ is a radius of curvature of a corresponding one of the lenses, $a_{00}$, $a_{01}$, $a_{02}$, ... are aspherical coefficients of main-scanning-cross-sectional profiles of the lens, $R_{s0}$ is a radius of curvature of the lens on the optical axis in the sub-scanning direction, and $b_{00}$, $b_{01}$, $b_{02}$, ... are aspherical coefficients of sub-scanning-cross-sectional profiles of the lens.

Specific values of the coefficients in Equations are presented in Table 1.

TABLE 1

| | L1 | | L2 | |
|---|---|---|---|---|
| | INCIDENT SURFACE | EXIT SURFACE | INCIDENT SURFACE | EXIT SURFACE |
| Rm | −113.141 | −45.980 | −220.800 | −324.194 |
| $a_0$ | — | — | — | — |
| $a_4$ | −2.06E−06 | 8.57E−07 | 1.01E−06 | −6.22E−07 |
| $a_6$ | −9.53E−10 | −4.86E−10 | 2.12E−10 | 4.72E−10 |
| $a_8$ | 2.92E−12 | −6.05E−13 | −8.90E−14 | 8.12E−14 |
| $a_{10}$ | −1.44E−15 | 1.32E−15 | −1.18E−16 | −1.93E−16 |
| $a_{12}$ | −3.46E−19 | −1.43E−19 | 5.28E−20 | 5.68E−20 |
| $a_{14}$ | 4.37E−23 | −4.58E−22 | −5.69E−24 | −4.77E−24 |
| $R_{s0}$ | −22.150 | 34.888 | −300.000 | −15.000 |
| $b_1$ | 3.93E−04 | −4.70E−05 | — | 3.25E−05 |
| $b_2$ | 1.85E−05 | −1.65E−05 | 2.21E−07 | 1.28E−05 |
| $b_3$ | −3.39E−06 | 4.59E−07 | — | −1.33E−07 |
| $b_4$ | −2.31E−07 | −9.98E−08 | 6.50E−11 | −4.73E−09 |
| $b_5$ | 6.31E−09 | −7.53E−10 | — | 1.23E−10 |
| $b_6$ | 4.37E−10 | 1.15E−10 | 4.36E−13 | 3.16E−12 |
| $b_7$ | −2.78E−12 | 2.75E−13 | — | −4.36E−14 |
| $b_8$ | −2.15E−13 | −2.11E−14 | −1.55E−15 | −1.75E−15 |
| $b_9$ | −8.57E−16 | 5.61E−17 | — | 5.37E−18 |
| $b_{10}$ | 1.18E−19 | 4.70E−19 | −4.66E−16 | 1.76E−19 |

Described below are the powers (reciprocal of focal length) of the scanning lenses in the main-scanning direction and in the sub-scanning direction, and main-scanning-cross-sectional profiles of the scanning lenses.

Figure 3A:
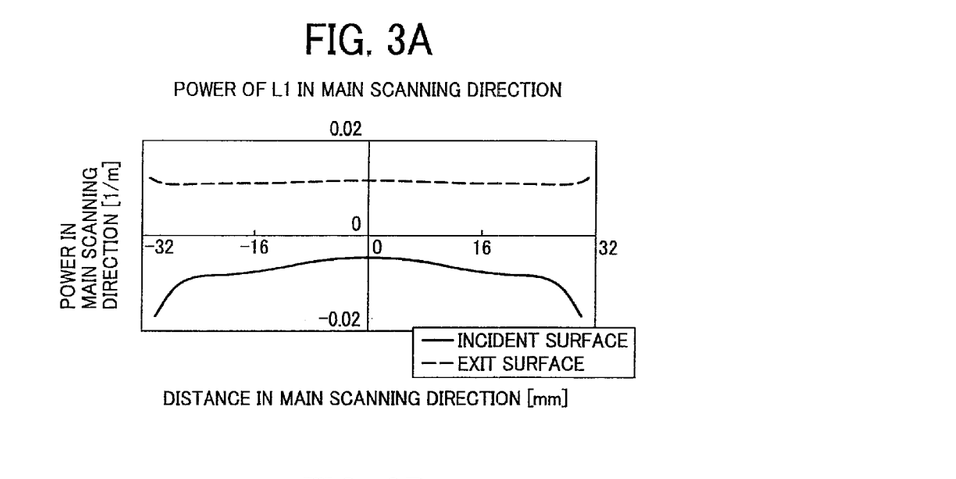
FIG. 3A illustrates powers in the main-scanning direction.

Power values of the first scanning lens 16 in the main-scanning direction at different lens heights are plotted in FIG. 3A. Powers of the incident surface are indicated by a solid line, while powers of the exit surface are indicated by a dotted line.

Figure 3B:
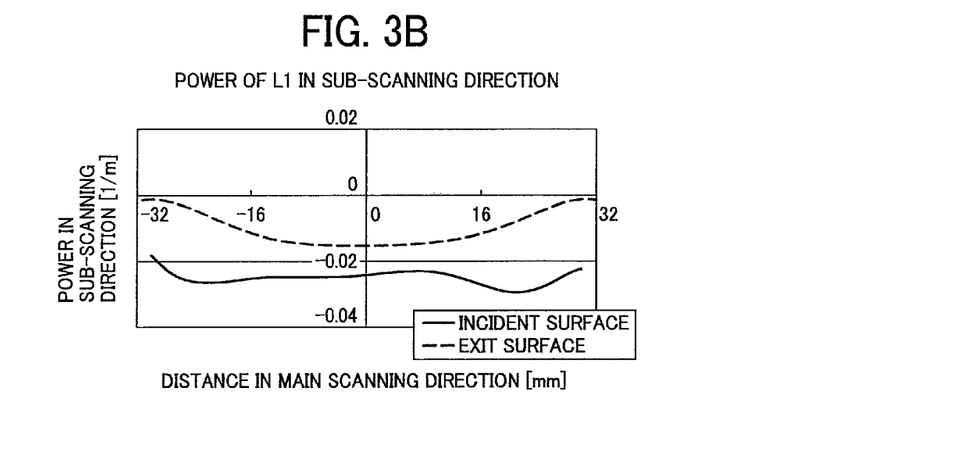
FIG. 3B illustrates powers in the sub-scanning direction.

Power values of the first scanning lens 16 in the sub-scanning direction at different lens heights are plotted in FIG. 3B. Powers of the incident surface are indicated by a solid line, while powers of the exit surface are indicated by a dotted line.

Figure 3C:
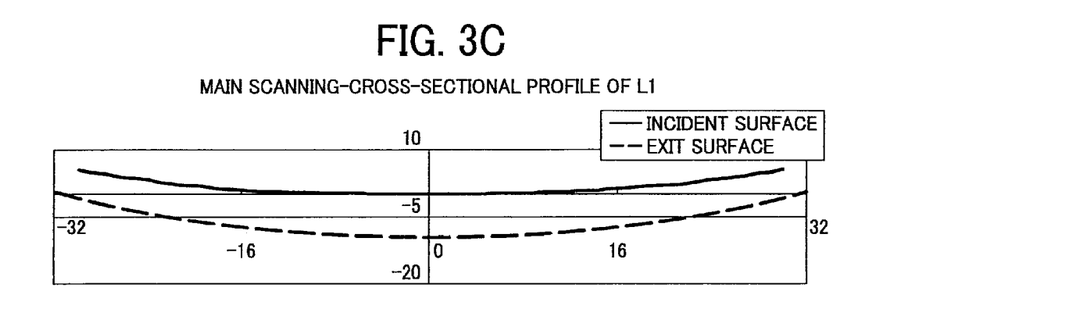
FIG. 3C illustrates main-scanning-cross-sectional profiles.

FIG. 3C is a graph illustrating main-scanning-cross-sectional profiles of the first scanning lens 16, in which the ordinate is the distance X between the surface and the origin in the optical axis direction while the abscissa is the lens height. Meanwhile, the optical axis is an axis that passes through a center point in the sub-scanning direction for Y=0 in Equation (2).

Figure 4A:
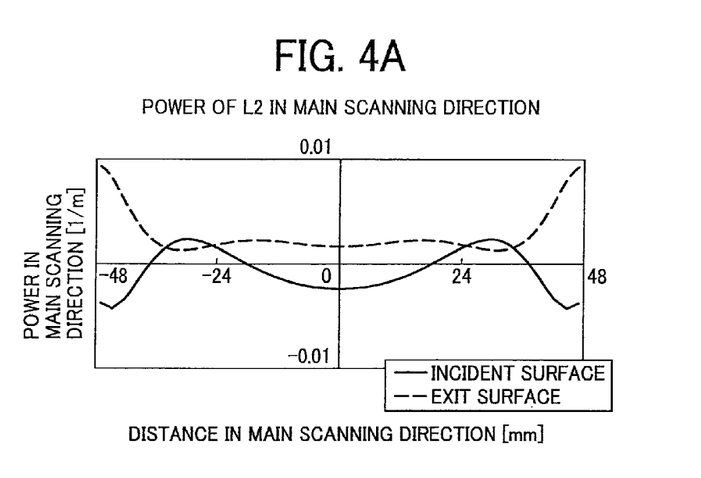
FIG. 4A illustrates powers in the main-scanning direction.

Power values of the second scanning lens 17 in the main-scanning direction at different lens heights are plotted in FIG. 4A. Powers of the incident surface are indicated by a solid line, while powers of the exit surface are indicated by a dotted line.

Figure 4B:
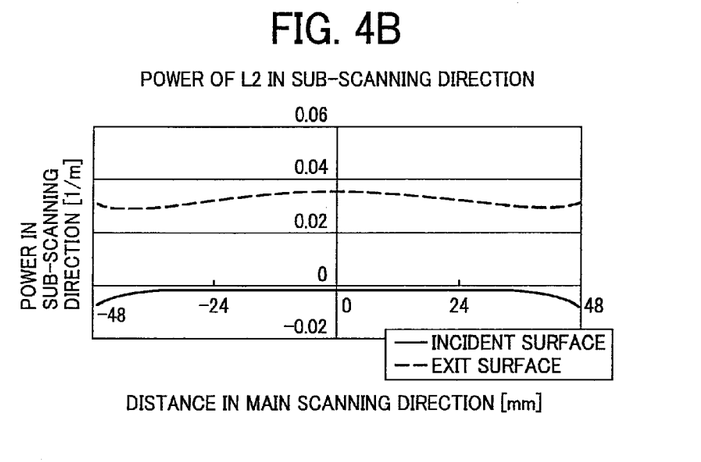
FIG. 4B illustrates powers in the sub-scanning direction.

Power values of the second scanning lens 17 in the sub-scanning direction at different lens heights are plotted in FIG. 4B. Powers of the incident surface are indicated by a solid line, while powers of the exit surface are indicated by a dotted line.

Figure 4C:
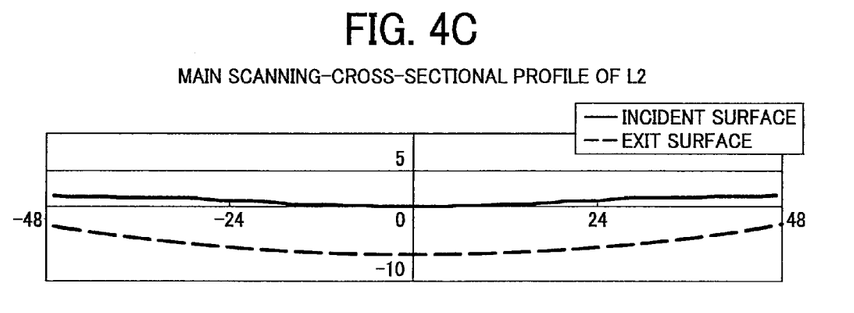
FIG. 4C illustrates main-scanning-cross-sectional profiles.

FIG. 4C is a graph illustrating main-scanning-cross-sectional profiles of the second scanning lens 17, in which the ordinate is distance X in the optical axis direction, while the abscissa is the lens height.

Optical distances between elements of the optical scanning device illustrated in FIG. 1 and sizes of the elements in the optical axis direction are presented in Table 2.

TABLE 2

| d1 | d2 | d3 | d4 | d5 | d6 | d7 | d8 | d9 | d10 | d11 |
|---|---|---|---|---|---|---|---|---|---|---|
| 25.19 | 4.50 | 14.60 | 8.16 | 3.00 | 95.00 | 37.00 | 9.80 | 16.03 | 6.40 | 140.23 |

The lateral magnification in the sub-scanning direction of the whole optical system of the optical scanning device 100 is −5.96 times; the lateral magnification in the sub-scanning direction of only optical system located nearer to the scanning surface than the polygon mirror 15 is −1.48 times.

As described above, the distance between the polygon mirror 15 and the exit surface of the second scanning lens 17 is 69.23 millimeters, which is relatively short; however, in a case where such surface geometries as presented in Table 1 are adopted, the distance between the polygon mirror 15 and the image-surface-side principal point of the scanning optical system is 104.73 millimeters. Put another way, the image-surface-side principal point of the scanning optical system is positioned nearer to the scanning surface 201 than the midpoint between the polygon mirror 15 and the scanning surface 201. Adopting this configuration allows the sub-scanning lateral magnification of the scanning optical system to be reduced to −1.48 times, which is relatively low.

Figure 5:
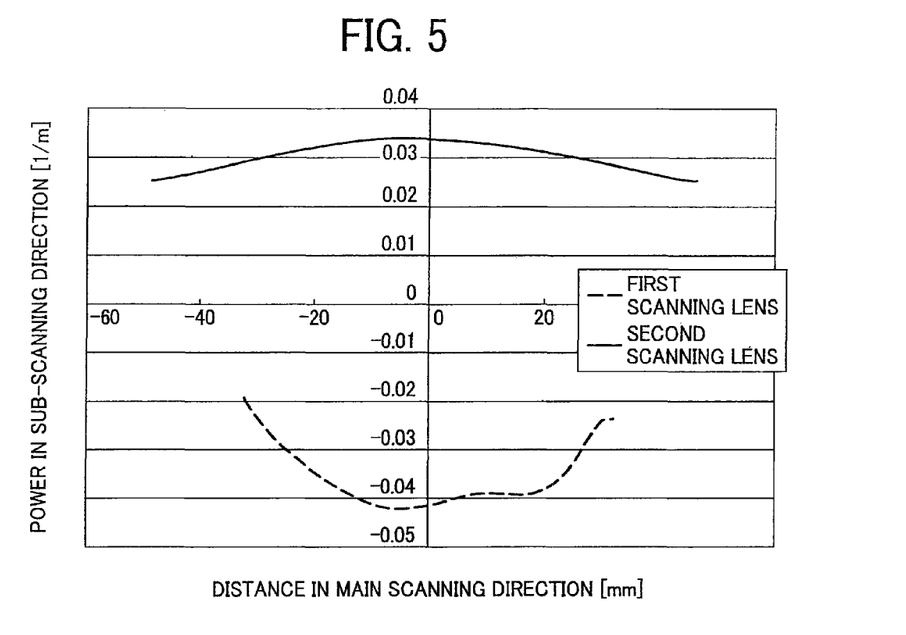
FIG. 5 is a graph of powers of the first scanning lens and the second scanning lens illustrated in FIG. 1 at different positions in the main-scanning direction.

Power values of the first scanning lens 16 and the second scanning lens 17 in the sub-scanning direction at different positions are plotted in FIG. 5.

Meanwhile, arranging the image-surface-side principal point close to the scanning surface arises a need for causing the first scanning lens 16 to have a surface that has relatively great positive power and the second scanning lens 17 to have a surface that has relatively great negative power. The first scanning lens 16 and the second scanning lens 17 are thus to be configured to have the thus-increased powers so as to have variation in installation position, which can result in field curvature in the sub-scanning direction, thereby disadvantageously causing beam-spot size to vary in the sub-scanning direction. The variation in beam-spot size in the sub-scanning direction due to variation in installation position is particularly notable in outer regions of the first scanning lens 16 and the second scanning lens 17 as compared to that in a center region.

To this end, by configuring the first scanning lens 16 and the second scanning lens 17 such that their powers in the sub-scanning direction decrease as the distance from the center portion in the main-scanning direction increases as illustrated in FIG. 5, influence exerted by the variation in the installation position of the scanning lenses can be reduced.

Presented in Table 5 are values calculated from Equation (1) and Equation (2) for a first scanning lens and a second scanning lens serving as a comparative example, of which layout designs are the same as that illustrated in FIG. 1 but of which geometries are changed only in the sub-scanning direction from those described above.

The first scanning lens employed in the comparative example is a meniscus lens and formed to have a sub-scanning lateral magnification of −2.16 times. This indicates that, even when the first scanning lens is of the same layout design as that of the present embodiment, if geometry in the sub-scanning direction is changed, sub-scanning lateral magnification of the first scanning lens is also changed.

Figure 6:
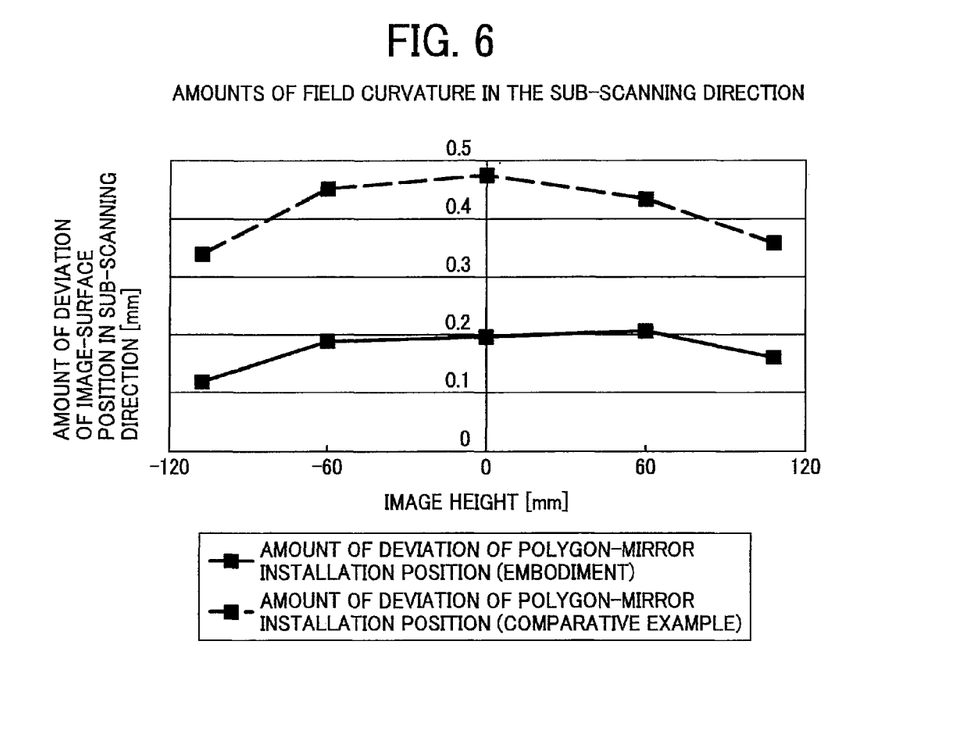
FIG. 6 is a graph of amounts of field curvature in the sub-scanning direction against different amounts of deviation of polygon-mirror installation position in a scanning optical system illustrated in FIG. 1 and those in a scanning optical system of a comparative example.

Shown in FIG. 6 are amounts of field curvature in the sub-scanning direction in an optical scanning device that uses scanning lenses formed according to the present embodiment (having lens-surface geometry presented in Table 1) and those in an optical scanning device that uses the scanning lenses of the comparative example (having lens-surface geometry presented in Table 3) against variation in installation position of the polygon mirror. In FIG. 6, where the present embodiment is indicated by a solid line while the comparative example is indicated by a dotted line, plotted are amounts of field curvature in the sub-scanning direction at different image heights on the scanning surface in a state, where installation position of the polygon mirror is deviated only by 0.05 millimeter toward the first scanning lens.

TABLE 3

| | L1 | | L2 | |
|---|---|---|---|---|
| | INCIDENT SURFACE | EXIT SURFACE | INCIDENT SURFACE | EXIT SURFACE |
| CURVATURE IN MAIN-SCANNING DIRECTION | −113.141 | −45.980 | −220.800 | −324.194 |
| $a_0$ | — | — | — | — |

TABLE 3-continued

| | L1 | | L2 | |
|---|---|---|---|---|
| | INCIDENT SURFACE | EXIT SURFACE | INCIDENT SURFACE | EXIT SURFACE |
| $a_4$ | −2.06E−06 | 8.57E−07 | 1.01E−06 | −6.22E−07 |
| $a_6$ | −9.53E−10 | −4.86E−10 | 2.12E−10 | 4.72E−10 |
| $a_8$ | 2.92E−12 | −6.05E−13 | −8.90E−14 | 8.12E−14 |
| $a_{10}$ | −1.44E−15 | 1.32E−15 | −1.18E−16 | −1.93E−16 |
| $a_{12}$ | −3.46E−19 | −1.43E−19 | 5.28E−20 | 5.68E−20 |
| $a_{14}$ | 4.37E−23 | −4.58E−22 | −5.69E−24 | −4.77E−24 |
| CURVATURE IN SUB-SCANNING DIRECTION | −22.110 | 38.510 | 100.000 | −24.500 |
| $b_1$ | 1.16E−06 | 1.22E−05 | — | −6.65E−06 |
| $b_2$ | −4.53E−05 | −3.72E−05 | −2.17E−06 | 7.65E−06 |
| $b_3$ | −1.22E−07 | 3.93E−10 | — | −1.04E−08 |
| $b_4$ | −9.70E−08 | −9.18E−08 | −2.40E−10 | 1.58E−09 |
| $b_5$ | 1.65E−10 | 6.63E−12 | — | 7.55E−12 |
| $b_6$ | 9.79E−12 | 9.61E−12 | 4.36E−13 | −1.44E−12 |
| $b_7$ | −7.08E−14 | −1.27E−14 | — | −2.10E−15 |
| $b_8$ | 3.47E−14 | 3.12E−15 | 7.59E−15 | −6.05E−16 |
| $b_9$ | −3.04E−18 | −1.76E−17 | — | 1.96E−19 |
| $b_{10}$ | 1.55E−20 | −1.81E−20 | −7.88E−16 | 5.07E−21 |

It is indicated in FIG. 6 that, in the present embodiment, amount of field curvature that results from variation in installation position of components can be reduced by reducing the sub-scanning lateral magnification.

The optical scanning device 100 can also be favorably applicable to embodiments that include a plurality of photosensitive drums. Below described is, as an example of the embodiments, an apparatus, such as a color printer, that includes the optical scanning device according to the present embodiment and performs optical writing onto four photosensitive drums of different colors with reference to FIG. 7.

Figure 7:
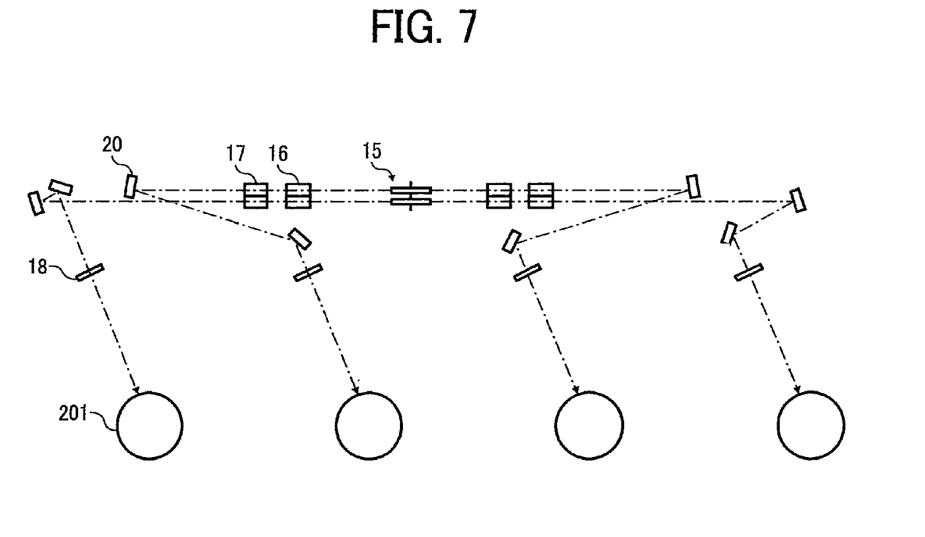
FIG. 7 is a schematic diagram illustrating how four photosensitive drums are simultaneously optically scanned by the optical scanning device illustrated in FIG. 1.

Arranging the first scanning lens 16 and the second scanning lens 17 between the polygon mirror 15 and the reflecting mirror 20 as illustrated in FIG. 7 allows flexibility in layout design of the reflecting mirror to be ensured.

Although the polygon mirror is used as a deflecting unit in the present embodiment, various types of deflecting unit can be employed as the deflecting unit in the present invention. For instance, even when a micro-mirror component is used as the deflecting unit, the advantage of the present embodiment can be obtained.

Image Forming Apparatus:

An exemplary embodiment of image forming apparatus according to the present invention is described below with reference to FIG. 8.

An image forming apparatus 300 according to the present embodiment is a multifunction peripheral (MFP) that serves as a copying machine, a printer, and a facsimile, and configured to be capable of forming full-color images. When serving as the printer or the facsimile, the image forming apparatus 300 performs image forming operations based on image signals that represent image information externally fed to the image forming apparatus 300. The image forming apparatus 300 is capable of forming an image on various types of recording medium, examples of which include not only ordinary paper in general use for copying or the like but also overhead transparency, thick paper such as cardboards and postcards, and envelopes.

The image forming apparatus 300 includes a main body 99 which is a main portion of the image forming apparatus 300, a reading device 21 arranged above the main body 99 for serving as a scanner in an original, an automatic document feeder (ADF) 22 arranged above the reading device 21 to feed an original placed on the ADF 22 toward the reading device 21, and a sheet feeding device 23 arranged in a lower portion of the main body 99 for serving as a print-sheet receptacle that stacks thereon one or more transfer sheets S, each of which is a recording medium to be fed toward one of nips between photosensitive drums 20Y, 20M, 20C, and 20K and an intermediate transfer belt 29 and is also a transfer medium.

The image forming apparatus 300 is a tandem image forming apparatus that includes the photosensitive drums 20Y, 20M, 20C, and 20K, each being made of a photosensitive member on its cylindrical external surface, and aligned in a line. The photosensitive drums 20Y, 20M, 20C, and 20K are latent image carriers, on each of which an image of a corresponding one of different colors, or specifically yellow, magenta, cyan, and black, obtained by color separation is to be formed.

The photosensitive drums 20Y, 20M, 20C, and 20K that are identical in diameter and arranged at regular intervals at positions above the intermediate transfer belt 29 to face the outer circumferential surface of the transfer belt 29, or, put another, the surface where images are to be formed on the transfer belt 29. The transfer belt 29 is an endless belt arranged inside the main body 99 of the image forming apparatus 300 at a substantially center portion of the main body 99. The photosensitive drums 20Y, 20M, 20C, and 20K are aligned in this order from upstream relative to a direction indicated by arrow A1 in FIG. 8. Each of the photosensitive drums 20Y, 20M, 20C, and 20K includes a corresponding one of image forming stations 60Y, 60M, 60C, and 60K that serve as image forming units for forming a corresponding one of a yellow image, a magenta image, a cyan image, and a black image.

The transfer belt 29 is an elastic belt all layers of which are made of elastic material, such as rubber. The transfer belt 29 can alternatively be a single-layer elastic belt or an elastic belt a portion of which is made of elastic material. Examples of the elastic material include fluorine resin, polycarbonate resin, and polyimide resin that have conventionally been employed.

The transfer belt 29 is rotatable in the direction indicated by arrow A1 while facing the photosensitive drums 20Y, 20M, 20C, and 20K. Visible images, or, in other words, toner images formed on the photosensitive drums 20Y, 20M, 20C, and 20K are sequentially transferred onto the transfer belt 29 rotating in the direction indicated by arrow A1 so as to be superimposed on one another (hereinafter, "superimposing transfer") and thereafter transferred in a cluster onto the transfer sheet S.

More specifically, the superimposing transfer onto the transfer belt 29 is performed such that while the transfer belt 29 is rotated in the direction indicated by arrow A1, the toner images formed on the photosensitive drums 20Y, 20M, 20C, and 20K are transferred onto the same position on the transfer belt 29 so as to be superimposed on one another. This transfer is performed through voltage application by primary transfer rollers 12Y, 12M, 12C, and 12K, each of which serves as a transfer electrostatic charger and is located to face a corresponding one of the photosensitive drums 20Y, 20M, 20C, and 20K with the transfer belt 29 therebetween. The transfer is performed at different transfer positions, at each of which one of the photosensitive drums 20Y, 20M, 20C, and 20K is opposed to the transfer belt 29, at different points in time such that transfer is sequentially performed from upstream to downstream along the direction indicated by arrow A1.

The image forming apparatus 300 further includes the four image forming stations 60Y, 60M, 60C, and 60K, a transfer-belt unit 290 that is positioned to face the photosensitive drums 20Y, 20M, 20C, and 20K from below and is an intermediate transfer device provided with the transfer belt 29 and serving as a belt unit, and a secondary transfer roller 5 that serves as a transfer member that is located to face the transfer belt 29, brought into contact with the transfer belt 29 at a nip position, and rotated in the same rotation direction as that of the transfer belt 29 at the nip position.

The image forming apparatus 300 further includes a cleaning device (not shown) that is located to face the transfer belt 29 and cleans the surface of the transfer belt 29, and the optical scanning device 100 that is an optical writing device that is located to face the image forming stations 60Y, 60M, 60C, and 60K from above.

The image forming apparatus 300 further includes a pair of registration rollers 130 that feeds a recording sheet S fed from the sheet feeding device 23 toward a transfer portion between the transfer belt 29 and the secondary transfer roller 5 timed to toner-image forming performed by the image forming stations 60Y, 60M, 60C, and 60K, and a sensor (not shown) that detects that a leading end of the transfer sheet S has reached the pair of registration rollers 130.

Figure 8:
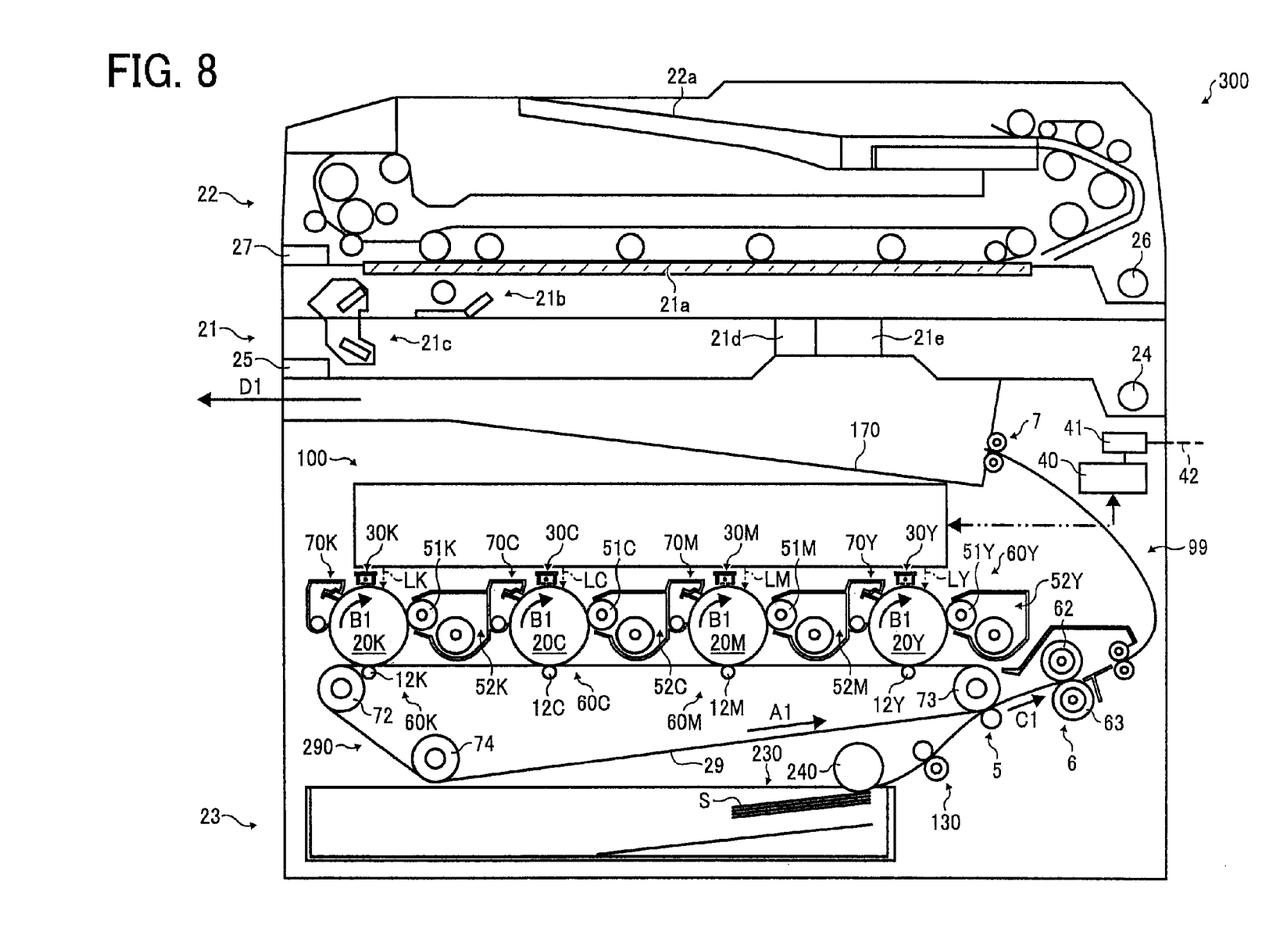
FIG. 8 is a schematic cross-sectional view illustrating the configuration of an image forming apparatus according to an embodiment of the present invention.

The image forming apparatus 300 further includes a fixing device 6 that receives the transfer sheet S, onto which the toner images have been transferred and which is conveyed in the direction indicated by arrow C1 in FIG. 8 into the fixing device 6, and fixes the toner images onto the transfer sheet S, a pair of sheet output rollers 7 that delivers the transfer sheet S undergone fixing performed by the fixing device 6 out of the main body 99, and a sheet output tray 170 that receives and stacks thereon the transfer sheet S delivered from the main body 99 by the sheet output rollers 7.

The image forming apparatus 300 further includes a control unit 40 that includes a central processing unit (CPU) (not shown) and memory (not shown) and performs centralized control of various elements provided in the image forming apparatus 300 and their operations, such as drive control of the optical scanning device 100, a communication control unit 41 that controls communications to and from a host apparatus, such as a personal computer, connected to the image forming apparatus 300 via a network 42, and toner bottles (not shown) each containing toner of a corresponding one of different colors, or specifically yellow, magenta, cyan, and black.

The image forming apparatus 300 is an internal-sheet-output-tray type image forming apparatus, in which the sheet output tray 170 is positioned in an upper portion in the main body 99, below the reading device 21. The transfer sheet S stacked on the sheet output tray 170 is to be taken out downstream relative to a direction indicated by arrow D1, or leftward in FIG. 8.

The transfer belt unit 290 includes, in addition to the intermediate transfer belt 29, the primary transfer rollers 12Y, 12M, 12C, and 12K, a drive roller 72 over which the intermediate transfer belt 29 is looped, a transfer-entrance roller 73 that is one of a pair of secondary-transfer rollers, and a tension roller 74 that is a driven roller. The drive roller 72 is rotated by a motor (not shown) serving as a drive source; by rotation of the drive roller 72, the transfer belt 29 is rotated in the direction indicated by arrow A1.

The fixing device 6 includes a fixing roller 62 that internally includes a heat source, and a pressure roller 63 that is pressed against the fixing roller 62. The fixing device 6 is configured such that while a transfer sheet S with a toner image thereon passes through a fixing portion, which is a nip between the fixing roller 62 and the pressure roller 63, heat and pressure are applied onto the transfer sheet S, thereby fixing the toner image onto the surface of the transfer sheet S.

The optical scanning device 100 of the image forming apparatus is the same optical scanning device of the embodiment described above and emits laser light LY, LM, LC, and LK based on image signals so that the scanning surfaces, which are the surfaces of the photosensitive drums 20Y, 20M, 20C, and 20K, are scanned for exposure to form electrostatic latent images thereon. The laser light LY, LM, LC, and LK that is optical information obtained by converting electric information that represents an image to be formed. This optical information is written by the optical scanning device 100 to the photosensitive drums 20Y, 20M, 20C, and 20K in the form of latent images.

The optical scanning device 100 is configured to be attachable and detachable to and from the main body 99 such that with the optical scanning device 100 detached from the main body 99, a process cartridge, which will be described later, that is provided in each of the image forming stations 60Y, 60M, 60C, and 60K can be upwardly removed from the main body 99 independently.

The sheet feeding device 23 includes a sheet feed tray 230, on which transfer sheets S can be stacked, and a sheet feeding roller 240 that picks up and feeds one of the transfer sheets S stacked on the sheet feed tray 230 from the sheet feed tray 230.

The reading device 21, which is positioned above the main body 99, is supported on a shaft 24 that is arranged at an upstream end portion of the image forming apparatus 300 with respect to the direction indicated by arrow D1 to be pivotally connected to the main body 99; this allows the reading device 21 to be raised, or opened, and lowered, or closed, relative to the main body 99.

The reading device 21 includes, at a downstream end portion with respect to the direction indicated by arrow D1, a handle portion 25 to be gripped when the reading device 21 is opened relative to the main body 99. The reading device 21 is pivotable about the shaft 24; by holding the reading device 21 at the handle portion 25 and moving the reading device 21 upward, the reading device 21 can be opened relative to the main body 99. The reading device 21 can be pivoted to be open approximately 90 degrees relative to the main body 99. This facilitates access to the interior of the main body 99, operation of closing the reading device 21 relative to the main body 99, and the like.

The reading device 21 includes an exposure glass 21a where an original is to be placed, a light source (not shown) that illuminates the original placed on the exposure glass 21a, a first carriage 21b that includes a first reflector (not shown) that reflects light that is emitted from the light source, reflected from the original, and incident on the first reflector, and that moves in lateral direction of FIG. 8, a second carriage 21c that includes a second reflector (not shown) that reflects the light that is reflected from the first reflector of the first carriage 21b and incident on the second reflector, an image-forming lens 21d that converges the light traveling from the second carriage 21c to form an image, and a reading sensor 21e that reads data representing an image of the original by receiving the light passed through the image-forming lens 21d.

The ADF 22, which is positioned on the reading device 21, is supported on a shaft 26 that is arranged at an upstream end portion of the image forming apparatus 300 with respect to the direction indicated by arrow D1 so as to be pivotally connected to the reading device 21; this allows the ADF 22 to be raised, or opened, and lowered, or closed, relative to the reading device 21.

The ADF 22 includes, at a downstream end portion with respect to the direction indicated by arrow D1, a handle portion 27 to be gripped when the ADF 22 is to be opened relative to the reading device 21. The ADF 22 is pivotable about the shaft 26; by holding the ADF 22 at the handle portion 27 and moving the ADF 22 upward, the ADF 22 can be opened relative to the reading device 21, by which the exposure glass 21a is exposed.

The ADF 22 includes a document table 22a, on which original is to be placed, and a drive unit (not shown) that conveys the original placed on the document table 22a. To make a copy by using the image forming apparatus 300, original can be loaded by either placing the original on the document table 22a of the ADF 22 or, after pivoting the ADF 22 upward, by manually placing the original on the exposure glass 21a, closing the ADF 22, and pressing the original against the exposure glass 21a. The ADF 22 can be pivoted to be open approximately 90 degrees relative to the reading device 21. This facilitates operation of placing original on the exposure glass 21a, maintenance of the exposure glass 21a, and the like.

The configurations of the image forming stations 60Y, 60M, 60C, and 60K will be described with reference to FIG. 8 by way of example of the configuration of the image forming station 60Y that includes the photosensitive drum 20Y. The configuration of each one of the other image stations are substantially identical to the configuration of the image forming station 60Y. Hence, for convenience, elements of the other image forming stations are denoted by reference numerals and symbols corresponding to those of elements of the image forming station 60Y, and detailed descriptions are omitted. An element denoted by a reference numeral and symbol ending in any one of Y, M, C, and K is an element for use in forming an image of corresponding one of yellow, magenta, cyan, and black.

The image forming station 60Y includes, in addition to the photosensitive drum 20Y, the primary transfer roller 12Y, a cleaning device 70Y for use in cleaning the photosensitive drum 20Y, an electrostatic charging device 30Y that applies a high voltage to the photosensitive drum 20Y to electrostatically charge the photosensitive drum 20Y, and a developing device 52Y for use in developing the surface of the photosensitive drum 20Y that are arranged around the photosensitive drum 20Y along a rotation direction B1, or clockwise. The developing device 52Y includes a developing roller 51Y that is arranged to face the photosensitive drum 20Y.

The photosensitive drum 20Y, the cleaning device 70Y, the electrostatic charging device 30Y, and the developing device 52Y are constructed into a single unit serving as a process cartridge. The process cartridge is configured to be attachable and detachable to and from the main body 99. Configuring the elements into a process cartridge as described above allows the elements to be handled as a replaceable component, thereby greatly improving maintainability, which is fairly favorable.

As the photosensitive drum 20Y configured as described above is rotated in the direction indicated by arrow B1 in FIG. 8, the surface of the photosensitive drum 20Y is uniformly electrostatically charged by the electrostatic charging device 30Y and then scanned by the beam LY from the optical scanning device for exposure; a latent image for yellow image is thus formed on the surface. More specifically, the latent image is formed by causing the beam LY to traverse not only in the main-scanning direction, which is the direction perpendicular to the plane of FIG. 8, but also in the sub-scanning direction, which is the circumferential direction of the photosensitive drum 20Y, by rotation of the photosensitive drum 20Y in the direction indicated by arrow B1.

Electrostatically-charged yellow toner supplied by the developing device 52Y sticks to the electrostatic latent image having been formed as described above, thereby developing the latent image into a yellow toner image. This yellow toner image, which is a visible image, obtained by development is subjected to primary transfer performed by using the primary transfer roller 12Y rotating in the direction indicated by arrow A1 to be transferred onto the transfer belt 29. Residual toner and the like that remain on the transfer belt 29 after the transfer is scraped off by the cleaning device 70Y and recovered. The photosensitive drum 20Y is then subjected to next electrostatic charging performed by the electrostatic charging device 30Y.

A toner image of a corresponding one of the other colors is formed on each of the other photosensitive drums 20C, 20M, and 20K in a similar manner. The thus-formed toner images of the colors are subjected to primary transfer to be sequentially transferred onto the same position on the transfer belt 29 rotating in the direction indicated by arrow A1.

As the transfer belt 29 rotates in the direction indicated by arrow A1, the toner images superimposed on the transfer belt 29 on one another are moved to the transfer portion, at which the transfer belt 29 is opposed to the secondary transfer roller 5, and subjected to secondary transfer at the transfer portion to be transferred onto the transfer sheet S.

The transfer sheet S is picked up from the sheet feeding device 23 and conveyed to the nip between the transfer belt 29 and the secondary transfer roller 5 by the pair of registration rollers 130 timed to a detection signal output from the sensor so that the transfer sheet S reaches the nip when a leading end of the toner image on the transfer belt 29 is opposed to the secondary transfer roller 5.

After the toner images of all the colors have been transferred in a cluster onto the surface of the transfer sheet S, the transfer sheet S is conveyed in the direction indicated by arrow C1 into the fixing device 6. While passing through the fixing portion between the fixing roller 62 and the pressure roller 63, the transfer sheet S receives heat and pressure applied thereonto, by which the toner images are fixed onto the transfer sheet S. A multiple-color image is thus formed on the transfer sheet S through the fixing operation.

The transfer sheet S, onto which the toner images have been fixed, is delivered out of the fixing device 6 onto the sheet output tray 170 through the sheet output rollers 7. The intermediate transfer belt 29, from which the images have been transferred in the secondary transfer operation, is cleaned by the cleaning device to enter a state ready for a next primary transfer operation.

The image forming apparatus according to the present embodiment includes, as a device that performs exposure process, the optical scanning device according to the embodiment described above.

This optical scanning device is capable of reducing variation in beam-spot size resulting from dimensional variation and variation in installation position without sacrificing flexibility in layout design of the reflecting mirror, being configurable compact, and contributing to high-quality images. Accordingly, the image forming apparatus of the present embodiment that employs the optical scanning device is also configurable compact and capable of forming high-quality images.

According to an aspect of the present invention, by arranging scanning lenses close to an optical deflector while attaining reduction in sub-scanning-direction lateral magnification, can be provided are an optical scanning device, and an image forming apparatus that uses the optical scanning device, each having great flexibility in layout design of scanning optical system and narrow variation in beam-spot size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source;
an optical deflecting unit that deflects a light beam emitted from the light source to scan on a scanning surface in main-scanning direction; and
a scanning optical system that includes a first scanning lens and a second scanning lens that converge the light beam deflected by the optical deflecting unit onto the scanning surface;
wherein distance between an exit surface of the first scanning lens and an incident surface of the second scanning lens is shorter than distance between a deflection facet of the optical deflecting unit and an incident surface of the first scanning lens;
an exit surface of the second scanning lens is nearer to the deflection facet than a midpoint between the deflection facet and the scanning surface; and
an image-surface-side principal point of the scanning optical system in sub-scanning direction is nearer to the scanning surface than the midpoint between the deflection facet and the scanning surface; and
wherein sub-scanning-cross-sectional profile of the first scanning lens is double-concave at every image height, and sub-scanning-cross-sectional profile of the second scanning lens is meniscal at every image height, with concave surface of the second scanning lens being opposed to the deflector; and
wherein following relation is satisfied: $|\phi 3| \leq |\phi 2| \leq |\phi 1|$, where $\phi 1$ is power in the sub-scanning direction of the incident surface of the first scanning lens, $\phi 2$ is power in the sub-scanning direction of the exit surface of the first scanning lens, and $\phi 3$ is power in the sub-scanning direction of the incident surface of the second scanning lens, each of $\phi 1$, $\phi 2$, and $\phi 3$ being negative power.

2. The optical scanning device according to claim 1, wherein the first scanning lens has negative power in the sub-scanning direction at every image height, and the second scanning lens has positive power in the sub-scanning direction at every image height.

3. The optical scanning device according to claim 1, wherein each of power of the first scanning lens and power of the second scanning lens decreases at greater distances from an optical axis in the main-scanning direction.

4. The optical scanning device according to claim 1, further comprising a reflecting member that reflects the light beam deflected by the optical deflecting unit to guide onto the scanning surface, the reflecting member being provided between the second scanning lens and the scanning surface.

5. An image forming apparatus that forms an image by performing electrophotographic image forming process, the image forming apparatus comprising:
an optical scanning device as a device that performs exposure process in the electrophotographic image forming process, and wherein the optical scanning device includes:
a light source;
an optical deflecting unit that deflects a light beam emitted from the light source to scan on a scanning surface in main-scanning direction; and
a scanning optical system that includes a first scanning lens and a second scanning lens that converge the light beam deflected by the optical deflecting unit onto the scanning surface,
wherein distance between an exit surface of the first scanning lens and an incident surface of the second scanning lens is shorter than distance between a deflection facet of the optical deflecting unit and an incident surface of the first scanning lens,
an exit surface of the second scanning lens is nearer to the deflection facet than a midpoint between the deflection facet and the scanning surface,
an image-surface-side principal point of the scanning optical system in sub-scanning direction is nearer to the scanning surface than the midpoint between the deflection facet and the scanning surface, and
the distance between the deflection facet of the optical deflecting unit and the incident surface of the first scanning lens is longer than a distance between the incident surface of the first scanning lens and the exit surface of the second scanning lens, and
wherein following relation is satisfied: $|\phi 3| \leq |\phi 2| \leq |\phi 1|$, where $\phi 1$ is power in the sub-scanning direction of the incident surface of the first scanning lens, $\phi 2$ is power in the sub-scanning direction of the exit surface of the first scanning lens, and $\phi 3$ is power in the sub-scanning direction of the incident surface of the second scanning lens, each of $\phi 1$, $\phi 2$, and $\phi 3$ being negative power.

6. The image forming apparatus according to claim 5, wherein the image forming apparatus is a tandem image forming apparatus that includes a plurality of photosensitive members.

* * * * *